US 8,666,856 B2

(12) United States Patent
Tully

(10) Patent No.: US 8,666,856 B2
(45) Date of Patent: Mar. 4, 2014

(54) SIMPLE TRANCHE LEVERAGE, SEE THROUGH LEVERAGE AND ENHANCED SEE THROUGH LEVERAGE

(76) Inventor: Sean Tully, London (GB)

(*) Notice: Subject to any disclaimer, the term of this patent is extended or adjusted under 35 U.S.C. 154(b) by 691 days.

(21) Appl. No.: 12/707,240

(22) Filed: Feb. 17, 2010

(65) Prior Publication Data

US 2011/0202444 A1    Aug. 18, 2011

(51) Int. Cl.
*G06Q 40/00* (2012.01)

(52) U.S. Cl.
USPC .............................. 705/35; 705/36 R; 705/37

(58) Field of Classification Search
USPC .......................................................... 705/35
See application file for complete search history.

(56) References Cited

U.S. PATENT DOCUMENTS

| 7,558,751 | B2 | 7/2009 | Sauter et al. |
| 7,571,138 | B2 | 8/2009 | Miri et al. |
| 2006/0015430 | A1 | 1/2006 | Megale et al. |
| 2008/0021804 | A1 | 1/2008 | Deckoff |
| 2010/0325066 | A1* | 12/2010 | Lai et al. ..................... 705/36 R |

OTHER PUBLICATIONS

"Correlation Trading: Facts and Challenges" by Morsalani Sept 2005.*
"Valuing Credit Derivatives Using an Implied Copula Approach" John C. Hull and Alan D. White The Journal of Derivatives Winter 2006, vol. 14, No. 2: pp. 8-28.*
"Correlation Trading: Facts and Challenges" Financial Workshop Ulm Sep. 2005 Dr. Mohamed El Morsalani Landesbank Baden-Württemberg.*

* cited by examiner

*Primary Examiner* — James A Vezeris
(74) *Attorney, Agent, or Firm* — Husch Blackwell LLP

(57) ABSTRACT

STL(0), STL(X) and ESTL(X) are processes for determining unique measures of risk for fixed income derivatives and securities. The processes are based on determining this unique concept of risk for a given outer capital structure layer and then combining that risk measure with the average of a similar risk measure of securities referenced by that capital structure repetitively until a base reference level is reached. In particular, a storage device comprises computer-executable instructions for determining risk of a financial instrument which is affected by or offered as a plurality of tranches. The computer-executable instructions, when executed on a programmable computer: identify a width, W, of a given tranche of the instrument; identify an attachment ratio, A, of the given tranche; and determine a liability ratio of the tranche by subtracting the attachment ratio from unity; and determine a simple tranche leverage value, STL(0), of the tranche by dividing the liability ratio by the width.

17 Claims, 5 Drawing Sheets

SIMPLE TRANCHE LEVERAGE, SEE THROUGH LEVERAGE AND ENHANCED SEE THROUGH LEVERAGE

FIELD OF INVENTION

The present invention relates to a method of determining the riskiness of ratings allocated to financial instruments, such as fixed income derivatives and securities. The present invention also relates to determining a measure of riskiness for the underlying assets themselves.

BACKGROUND OF THE INVENTION

Present day fixed income securities generally require ratings in order to be sold to investors. There are many reasons for this. Ratings act as a relative value and relative safety measure for all rated fixed income instruments. These ratings are used by investors to limit risk in mutual funds, and across their individual asset purchase decisions. Regulators use these ratings to limit risks at banks, investment banks and insurance companies globally. Ratings tools rate corporate, sovereign and structured securities of every kind. Rated structured securities include asset backed securities (ABS), asset backed commercial paper (ABCP), collateralized debt obligations (CDOs), collateralized synthetic obligations (CSOs), collateralized loan obligations (CLOs), residential mortgage backed securities (RMBS), commercial mortgage backed securities (CMBS) etc. Furthermore, ratings agencies use the ratings of these securities in order to then rate corporations which hold large quantities of securities themselves. In particular, they use these ratings to then help rate insurance companies, banks, monoline insurance companies, credit derivative product companies, etc.

In recent history, the ratings for these entities, while crucially important to the financial system, have failed to accurately detect the risk in these securities. As such, it has been desirable to design a new measure of risk which would better determine the risk of these securities with limited user intervention, for example automatically, by a computer. In particular, the Bank for International Settlements (BIS) Committee on the Global Financial system (CGFS) has called for a review of the existing ratings framework and has called for the design of an additional risk measure which would enhance current measures, in order to detect automatically the risks which rating agencies themselves appear to have missed during the financial crisis of 2007 and 2008.

U.S. Pat. No. 7,571,138 describes software which aggregates and integrates credit exposure and credit data across accounting, trading and operational systems within an organization and generates views of available credit in light of the exposure and credit limits. A comprehensive model of exposure to all counterparties, across all of their divisions and subsidiaries, is assembled, enabling the creation of a hierarchical view of each counterparty that models its real-world parent-child relationships.

United States Patent Application Publication No. 2008/0021804 describes a method and system for determining investor participation driven stock purchase indices. Raw customer trading data is received from an accounting system. The raw customer trading data is then aggregated to generate daily transaction total counts for all stocks (that is, total shares bought and sold, total market value, etc.) as well as daily transaction total counts for each individual stock. The aggregated data is processed to produce moving averages, stock purchase indices, and stock rankings. The stock purchase indices are based on a diffusion index technique of segregating buyers from sellers, and with these relative counts, measures the breadth of investor purchasing participation.

U.S. Pat. No. 7,558,751 describes a system that creates stock indices based on the "buy, sell and hold" research recommendations of research firms, tracks the performance of those indices, and allows clients to search for top performing indices according to a variety of search parameters and filters through a proprietary text navigation searching mechanism.

United States Patent Application Publication No. 2006/0015430 describes a method for creating indices of forecasts of performance regarding financial markets, in which a number of performances for each element of a number of markets and/or financial tools are considered as unknown variables; the described method comprises the following steps: defining an objective function as the sum of the squares of the differences of the homologous elements of the correlation matrix calculated on the variables and of the correlation matrix supplied as forecast, and minimizing said objective function using a non-linear programming algorithm for identification of global optima so as to obtain said indices of forecasts of performance regarding financial markets.

It is an object of the invention to provide an improved measure of risk of financial instruments. It is a further object of the invention to provide an index which represents an improved measure of risk of financial instruments.

SUMMARY OF THE INVENTION

In a first aspect of the present invention, there is provided a storage device comprising computer-executable instructions for determining risk of a financial instrument which is affected by or offered as a plurality of tranches, wherein the computer-executable instructions, when executed on a programmable computer:— identify a width, W, of a given tranche of the instrument;
identify an attachment ratio, A, of the given tranche; and
determine a liability ratio of the tranche by subtracting the attachment ratio from unity; and
determine a simple tranche leverage value, STL(0), of the tranche by dividing the liability ratio by the width.

It may be that a given tranche of a first financial instrument is exposed to the risk of a preceding tranche of a second financial instrument owned by a vehicle corresponding to the given tranche. As such, the storage device may further comprise computer-executable instructions for:— calculating the STL(0) of the given tranche according to the instructions of identifying and determining presented above;
calculating the STL(0) of the preceding tranche according to the instructions of identifying and determining presented above; and
determining a see-through-leverage value STL(1) by multiplying the STL(0) of the given tranche by the STL(0) of the preceding tranche.

A first SPE may issue tranche liabilities which itself owns or is affected by the tranche liabilities of other SPEs, which own or are affected by the tranche liabilities of other SPEs arranged in layers. As such, the storage device may further comprise computer-executable instructions for:

determine a see-through-leverage value STL(X) of the given tranche by multiplying the STL(0) of the given tranche by the STL(0) of each preceding tranche,
wherein X is an integer representative of the number of layers of preceding tranches.

A given tranche of a first financial instrument may contain the risk of a plurality of preceding tranches of a second financial instrument owned by a vehicle, the second financial instrument comprising a preceding tranche representative of an underlying debt obligation. As such, the storage device may further comprise computer-executable instructions for:— calculating the STL(0) of the given tranche;

calculating ESTL(1) for the preceding tranche by determining STL(0) for the preceding tranche and multiplying the determined STL(0) for the preceding tranche by the average borrower leverage of its underlying debt obligation; and determining an enhanced see-through-leverage value ESTL(X) by multiplying the STL(0) of the given tranche by the ESTL(1) of the preceding tranche.

A given tranche of a financial instrument may contain or be affected by a plurality of preceding tranches owned by a vehicle of one of the financial instruments which are arranged in layers. As such, the storage device may further comprise computer-executable instructions for:—

(a) determining STL(0) for each of the tranches for a given financial instrument in a given layer;

(b) determining a weighted average of STL(0), WAVGSTL(X), for all the financial instruments in the given layer;

(c) determining STL(0) for the common parent tranche; and (d) determining a see-through leverage value, STL(X) for the common parent, by multiplying STL(0) for the common parent tranche by WAVGSTL(X) of children of the common parent tranche.

In a second aspect of the invention, there is provided a storage device comprising computer-executable instructions for determining risk of a financial instrument offered as a plurality of tranches, the financial instrument having an underlying debt obligation, wherein the computer-executable instructions, when executed on a programmable computer:— identify a width, W, of a given tranche of the instrument;

identify an attachment ratio, A, of the given tranche; and determine a liability ratio of the tranche by subtracting the attachment ratio from unity;

determine a simple tranche leverage value, STL(0), of the tranche by dividing the liability ratio by the width;

determine a borrower leverage value of the underlying debt obligation; and determine an enhanced simple tranche leverage value, ESTL(0), of the tranche by multiplying the STL(0) by the average borrower leverage value.

In a third aspect of the present invention, there is provided a method for determining risk of a financial instrument which is affected by or offered as a plurality of tranches, comprising:— identifying a width, W, of a given tranche of the instrument;

identifying an attachment ratio, A, of the given tranche; and determining a liability ratio of the tranche by subtracting the attachment ratio from unity; and determining a simple tranche leverage value, STL(0), of the tranche by dividing the liability ratio by the width.

In the aforementioned method, each financial instrument may be offered as a plurality of tranches, wherein a given tranche of a first financial instrument is exposed to the risk of a preceding tranche of a second financial instrument owned by a vehicle issuing a liability of the given tranche, and the method may further comprise:— calculating the STL(0) of the given tranche according to the aforementioned method;

calculating the STL(0) of the preceding tranche according to the aforementioned method; and determining a see-through-leverage value STL(1) by multiplying the STL(0) of the given tranche by the STL(0) of the preceding tranche.

Tranches may be issued liabilities of a Special Purpose Entity (SPE), and that special purpose entity may itself own one or more tranche liabilities issued by other SPEs, therefore the issued tranche liabilities of the first SPE are affected by the risk of the tranche of the second entity which it owns. Hence, the tranches may be provided in layers of a capital structure, wherein at least some of the tranches in each layer are each exposed to the risk of a preceding tranche, the method further comprising:

determining a see-through-leverage value STL(X) of a given tranche by multiplying the STL(0) of the given tranche by the STL(X) of all preceding tranches, wherein X is an integer representative of the number of layers of SPEs which own tranche liabilities of preceding SPEs.

The financial instrument may be an underlying debt obligation, and the method may further comprise:— identifying a width, W, of a given tranche of the instrument;

identifying an attachment ratio, A, of the given tranche; and determining a liability ratio of the tranche by subtracting the attachment ratio from unity;

determining a simple tranche leverage value, STL(0), of the tranche by dividing the liability ratio by the width;

determining a borrower leverage value by dividing unity by a loan-to-value ratio, LTV, of the underlying child obligation (a child obligation is a loan or security owned by a company or SPE) subtracted from unity; and determining an enhanced simple tranche leverage value, ESTL(0), of the tranche liability by multiplying the STL(0) by the average borrower leverage value.

In the aforementioned method, a financial instrument may be offered as a given tranche liability of a first SPE, which may itself own a plurality of tranche liabilities of other SPEs, such that the tranche liability offered by the first SPE is affected by the risk of the preceding tranches it owns or references, the method may further comprise:— calculating the STL(0) of the given tranche according to the aforementioned method;

calculating ESTL(1) for the preceding tranches by determining STL(0) for each preceding tranche according to the aforementioned method and multiplying each determined STL(0) for childless preceding tranche by a average borrower leverage of its underlying debt obligation; and determining an enhanced see-through-leverage value ESTL(X) by multiplying the STL(0) of the given tranche by the ESTL(1) of each preceding tranche.

In a fourth aspect of the present invention, there is provided a method for determining risk of a tranche liability of an SPE, wherein that SPE owns or references the risk of the tranche liabilities of other SPEs including a base SPE finally owning loans, each SPE considered as a layer, comprising:—

(a) determining STL(0) for each of the tranches for a given financial instrument in a given layer according to the aforementioned method of the third aspect;

(b) determining a weighted average of STL(0), WAVGSTL(X), for all the financial instruments in the given layer having a common parent tranche;

(e) determining STL(0) for the common parent tranche according to the aforementioned method of the third aspect; and (f) determining a see-through leverage value, STL(X) for the common parent, by multiplying STL(0) for the common parent tranche by WAVGSTL(X) of children of the common parent tranche.

In one embodiment of the invention, when performing step (a) and a tranche is childless (meaning it owns assets which are not tranched liabilities, but instead typically loans or other debt securities of individuals, companies or governments), the method additionally comprises: multiplying the determined STL(0) for the childless tranche by the borrower leverage for an underlying loan or bond, such that when performing step (f), an enhanced see-through-leverage value ESTL (X) is determined.

The borrower leverage value may be determined by dividing unity by the loan-to-value ratio, LTV, of the underlying child obligation subtracted from unity, or may be determined from a ratio of Debt/Equity, Debt/EBITDA or Debt/Capital of the debt obligation wherein EBITDA is a debt to earnings ratio (before interest, taxes and depreciation).

Preferably, the width, W, of the given tranche is determined by subtracting the attachment ratio of the given tranche from a detachment point ratio of the given tranche.

Securitization of assets comprises setting up a special purpose company or entity (SPE) which is itself a recognized legal vehicle. As with any company, this SPE will generally issue debt liabilities and it will purchase assets. The debt liabilities may have a priority ranking. If there is enough money in the SPE to pay all liabilities in full, all liabilities get their defined cashflows. If for some reason that SPE does not have enough cash to pay all of the liabilities, a decision must be made on what liabilities to pay and in what amount. In the simplest structure the SPE may issue just two liabilities, or tranches, say a senior and a junior. In this case the senior liability (can be thought of as an IOU) will get paid first. If after paying that senior liability off in full their is still cash left over the junior liability will get whatever is left, and therefore will incur the loss of any shortfall.

An ABS is a securitization whereby an SPE purchases loans such as credit cards, auto debt or mortgages, and that SPE then issues tranche liabilities which are purchased by investors, that cash being used by the SPE to buy the loans. A CDO is a securitization which buys debt, in particular it may be the debt of an ABS SPE, say a particular or single tranche of a number of different ABS SPEs. That CDO then itself issues tranched liabilities to fund the purchase of those ABS tranched liabilities it purchased, which are its assets. Now, if for some reason many mortgages which were owned by one of the ABS SPEs foreclose, the ABS liabilities the CDO owns may be impaired, and the CDO may itself then not have enough money to pay in full all of the liabilities that it issued.

An SPE may issue tranched liabilities in order to purchase the tranched liabilities of another SPE, then the creditworthiness of all of the liabilities of the initial SPE will be affected by whether the tranched liabilities it purchased are paid back in full. The amount by which each of the tranched liabilities of the first SPE will be affected will be determined by the amount of the shortfall, the amount of subordination (junior liabilities which take the initial shortfall hit) and the thickness of the liability itself.

In general, STL(0), STL(X) and ESTL(X) are values which are determined by the above-mentioned processes and apparatus. The values can be generated automatically by a processing device to make particular estimates of the sensitivity of a given financial instrument's predicted expected loss, or probability of first dollar of loss (which are at present the methods which underlie current credit ratings for structured credit instruments, and required capital by many regulators globally) to changes in the predicted underlying loss distributions. Hence, the present invention permits the determination of the riskiness of a financial instruments, or the riskiness of an institution which holds many risk financial instruments. The present invention also provides an automatic measure of the risk of a change in the outlook of the riskiness of an instrument, or of financial institutions which hold many of these instruments under changing economic conditions. These represent a significant improvement to the current technologies of risk measurement of financial instruments and financial institutions.

BRIEF DESCRIPTION OF THE DRAWINGS

The present invention will now be described by way of example with reference to the accompanying drawings, in which:—

DETAILED DESCRIPTION OF THE INVENTION

Figure 1:
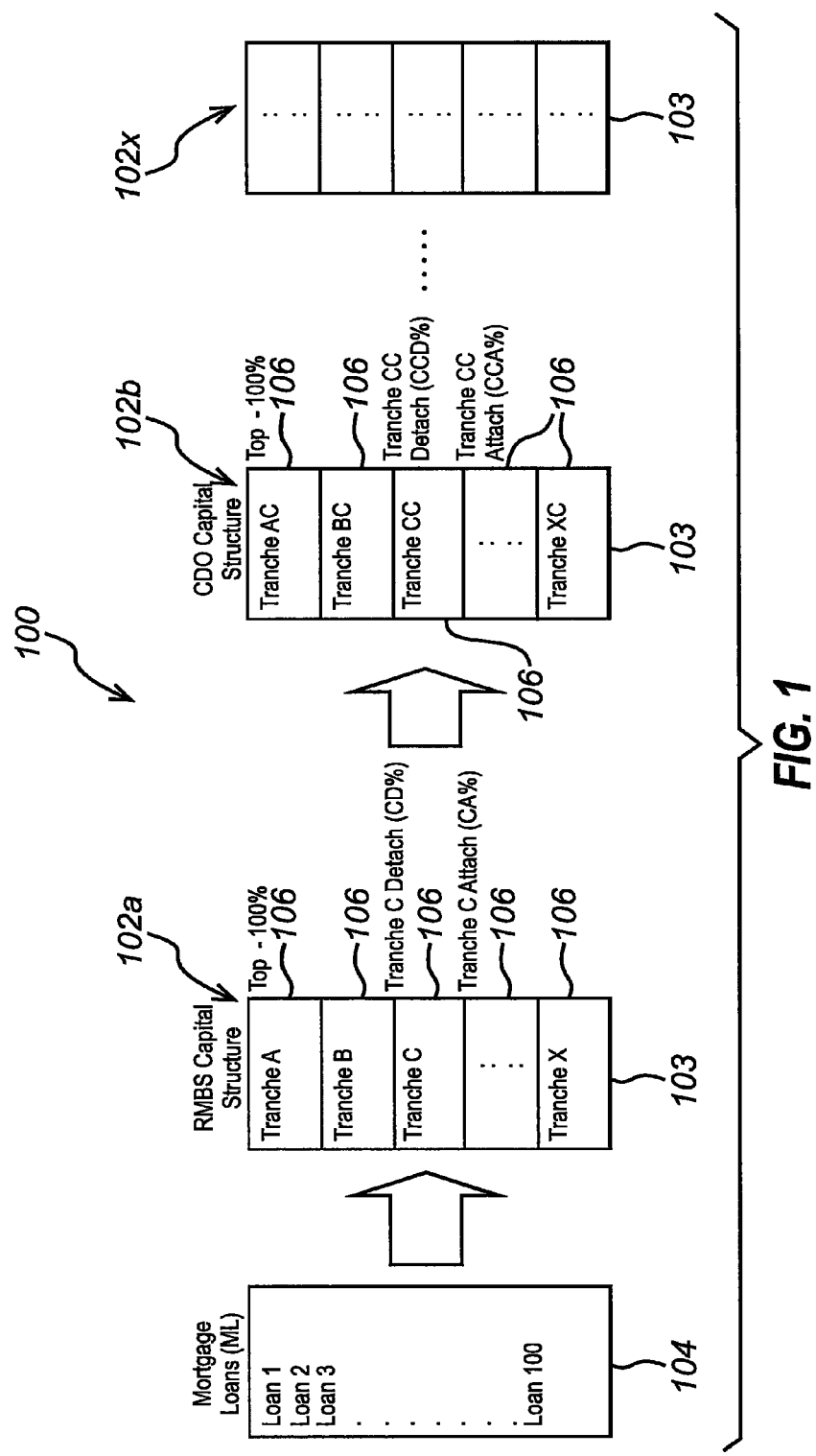
FIG. 1 is a schematic showing how simple tranche leverage may be determined according to one embodiment of the invention.

FIG. 1 shows layers 102a, 102b of capital structures representing issued liabilities of SPEs, which are secured against a plurality of underlying base assets 104, e.g. mortgage loans. Each layer 102a, 102b comprises a plurality of tranche liabilities 106 or base assets 104. The capital structure for a given layer (or SPE) 102a, 102b defines the subordination and seniority of each tranche liability 106. Each tranche liability 106 may have some amount of subordination under it and each tranche may be itself subordinate to other more senior tranche liabilities. In the particular embodiment disclosed in FIG. 1, the amount of subordination, as well as the amount of capital senior to a tranche in the capital structure of an SPE, may be represented as a percentage of the whole capital structure. In the particular, the width of a tranche, W, is defined as the percentage of capital represented by a tranche itself.

Simple Tranche Leverage (STL(0)) of the present invention is the width of a given tranche plus the total capital senior to that tranche, divided by the width of that tranche structure. Hence, from FIG. 1, for layer 102a, it will be seen that:

$$STL_C(0) = (100\% - CA\%)/(CD\% - CA\%)$$

where $STL_C(0)$ is the STL(0) of tranche C, CA % is the percentage attachment point of tranche C and CD % is the percentage detachment point of tranche C. The attachment point is the percentage subordination below a tranche and the detachment point is the level of losses which would fully wipe out the tranche.

It should be noted that that STL(0) ignores any specific information about the underlying assets which are purchased by the capital. Hence, for an equity tranche, or a tranche with no subordination, this is simply what would normally be referred to as its leverage.

In order to capture more effectively the risk of the structure, the underlying assets that the capital corresponding to a given SPE, that SPE itself then issuing tranche liabilities, has purchased, are considered. This is shown in FIG. 1, as exemplified by CDO layer 102b, where this CDO, or SPE, owns the tranche liabilities of other securitizations. The assets purchased by the CDO layer 102b may themselves have an STL(0) as described above.

In this way, "See Through Leverage level 1" (STL(1)) is defined as STL(0) for the outer capital structure, e.g. tranche liability CC of CDO layer 102b, multiplied by the average STL(0) of all the assets purchased by layer 102b, in this case the sole asset being Tranche C liability of 102a. Hence, STL (1)=STL(0) (of a given tranche)×STL(0) (of all assets owned by the given tranche). For the case shown in FIG. 1 where CDO layer 102b consists solely of tranche C, then:

$$STL_{CC}(1)=STL_C(o)\times STL_{CC}(0)\rightarrow STL_{CC}(1)=[(100\%-CA\ \%)\times(100\%-CCA\ \%)]/[(CD\ \%-CA\ \%)\times(CCD\ \%-CCA\ \%)]$$

where $STL_C(0)$ is the STL(0) of tranche C, CA % is the percentage attachment point of tranche C and CD % is the percentage detachment point of tranche C.

For a more complex case, SPE or CDO 102b owns or comprises a plurality of tranche assets, then a weighted average of the STL(0) values for all the underlying assets is used.

As in a CDO there may be several layers of securitizations involved, in which case STL(X) is defined for any number of layers, X, depending on the number of securitization layers it is desired need to see through. "See Through Leverage" then may be defined as STL(X) where X reaches the bottom floor, for example where there are no loans or bonds which themselves are not a securitization. STL(X) is a mathematical approximation of a tranche's sensitivity to errors in underlying loss assumptions at the point where losses first touch that tranche.

Figure 2:
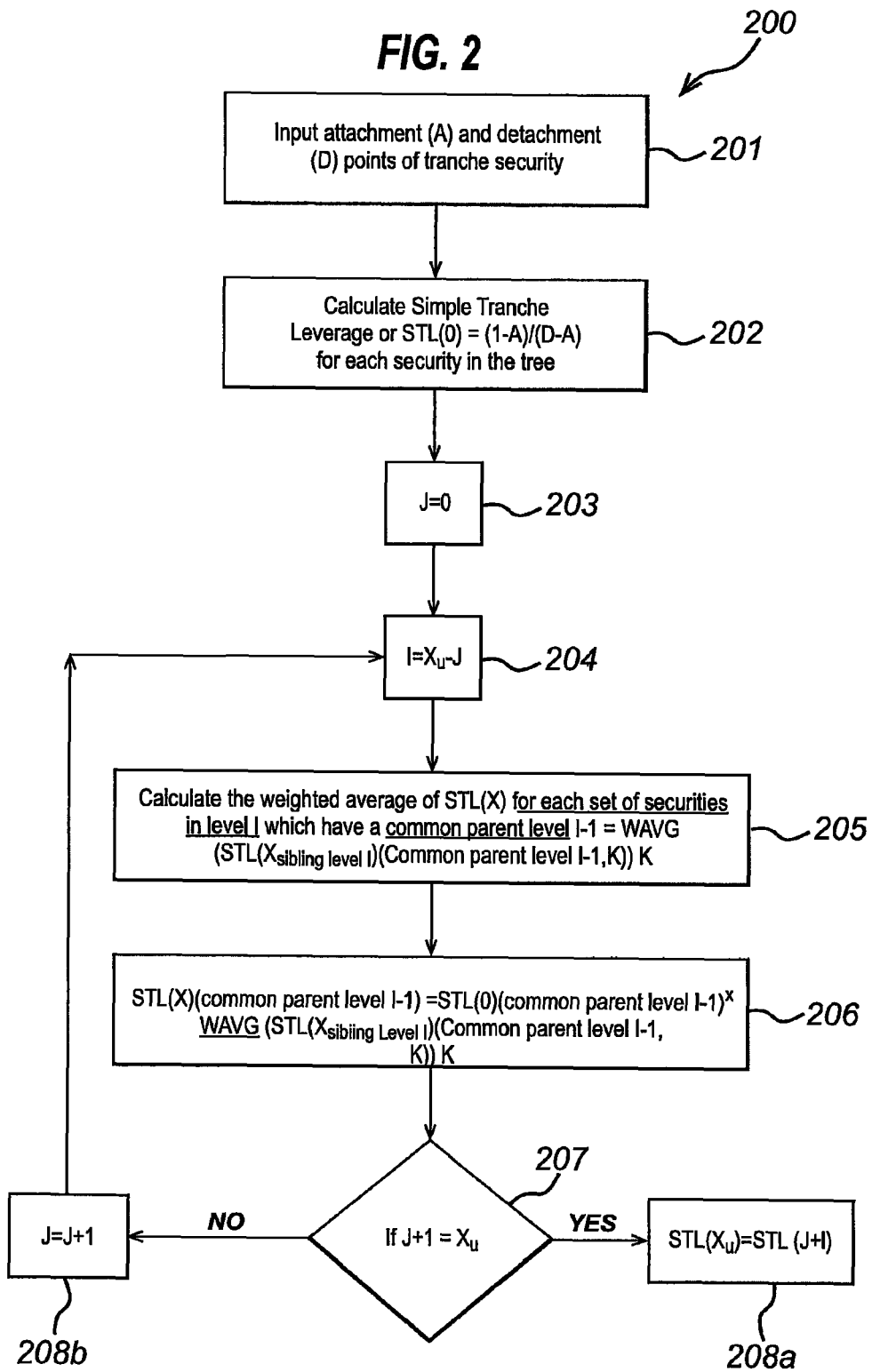
FIG. 2 is a flowchart of a process for determining see-through leverage based on simple tranche leverage according to the schematic of FIG. 1.

A method 200 of determining STL(X) can be generalized as shown in FIG. 2, in which: STL(0)=Simple Tranche Leverage, STL(X)=See Through Leverage, $X_u$=number of layers of children under ultimate parent U, X=number of generations of children below a parent, I−1=current level for which see through leverage being calculated, J=distance above level X, K is an index used to track direct children of a common parent, A=attachment point ratio, or the percentage of subordination below a tranche expressed as a decimal between zero and unity, and D=detachment point ratio, or the level of losses which would fully wipe out a tranche also expressed as a decimal between zero and unity.

In step 201, attachment (A) and detachment (D) points of tranches (in layered security structures arranged in a tree) are received or obtained by processing device 401 (see below).

In step 202, Simple Tranche Leverage (STL(0)) is determined as (1−A)/(D−A) for each security in the tree.

In step 203, J is set equal to zero.

In step 204, index I is set equal to $X_u$−J.

In step 205, a weighted average of STL(X) for each tranche of securities in level I which have a common parent in level I−1 is determined as WAVG ($STL(X_{sibling\ level\ I})$.

In step 206, STL(X) for tranches having a common parent in level I−1 is determined as STL(0) (for the tranche in common parent level I−1)×WAVG($STL(X_{sibling\ level\ I})$ (this is the "See Through Leverage" for parents in level I−1).

In step 207, it is determined whether J+1=$X_u$, and, if it does, then in step 208a, STL($X_u$) is finalised as STL(J+1). If it is determined that J+1 ◊ $X_u$, then J is incremented by one in step 208b and steps 204 to 207 are repeated.

In a further embodiment of the invention, STL, which measures a lender's leverage, can be extended to include borrower leverage of the base underlying asset 104. In this case, STL is multiplied by the leverage of the borrower that provides the underlying security (for example, this can be surmised from the LTVs of mortgages). Hence, Enhanced STL (ESTL) is determined which is an index which contains the layering of risk implied by both borrowers and lenders. In the simplest case:

$$ESTL_C(0)=STL(0)\times BL,$$

where borrower leverage, BL=1/(1−AVG(LTV)), and LTV is defined as the average loan-to-value ratio of the underlying loans 104.

Figure 3:
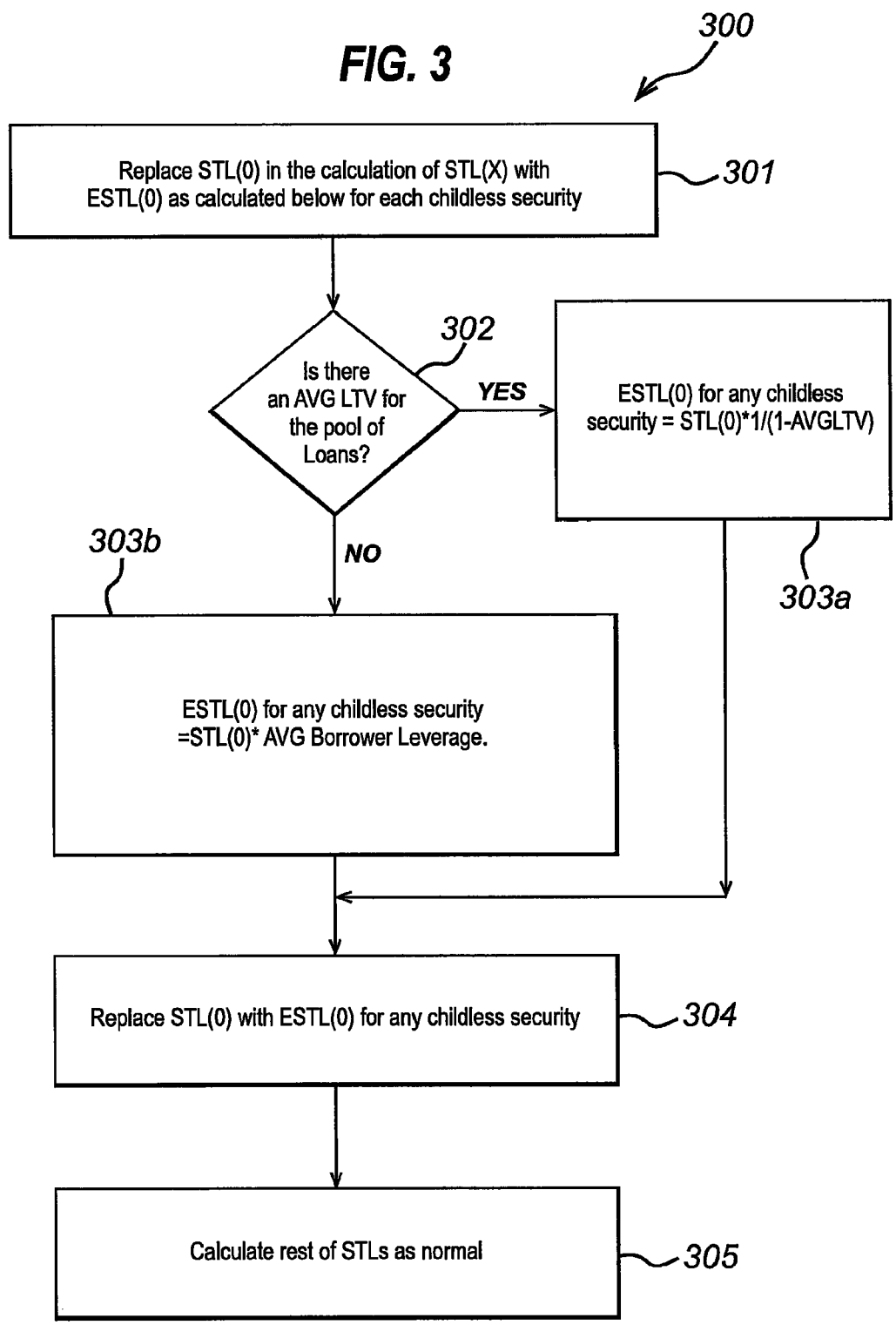
FIG. 3 is a flowchart of a process for determining enhanced see-through leverage based on the process of FIG. 2.

FIG. 3 shows one embodiment of a generic process for determining ESTL(X), i.e. ESTL for a given tranche having a number, X, of underlying layers, based on the process 200 for determining STL(X).

In step 301, in general the determination of STL(0) in the calculation of STL(X) is replaced with the calculation of ESTL(0), as explained in the further steps below.

In step 302, it is determined whether there is an average LTV (AVG(LTV)) for the pool of underlying loans. If yes, in step 303a, ESTL(0) for any tranche which is childless (i.e. does not have any underlying tranches) is determined as STL(0)*1/(1−AVG(LTV)). If no, in step 303b, ESTL(0) for any childless tranche is defined as STL(0)×AVG(BL), where BL is the average borrower leverage and might be defined as the average of the debtor's Debt/Equity, Debt/EBITDA, Debt/Capital.

In step 304, ESTL(0) is used in all calculations in FIG. 2, for which STL(0) is used.

In step 305, the remaining STL(X, where X ◊ 0) is determined according to FIG. 2, as usual.

Figure 4:
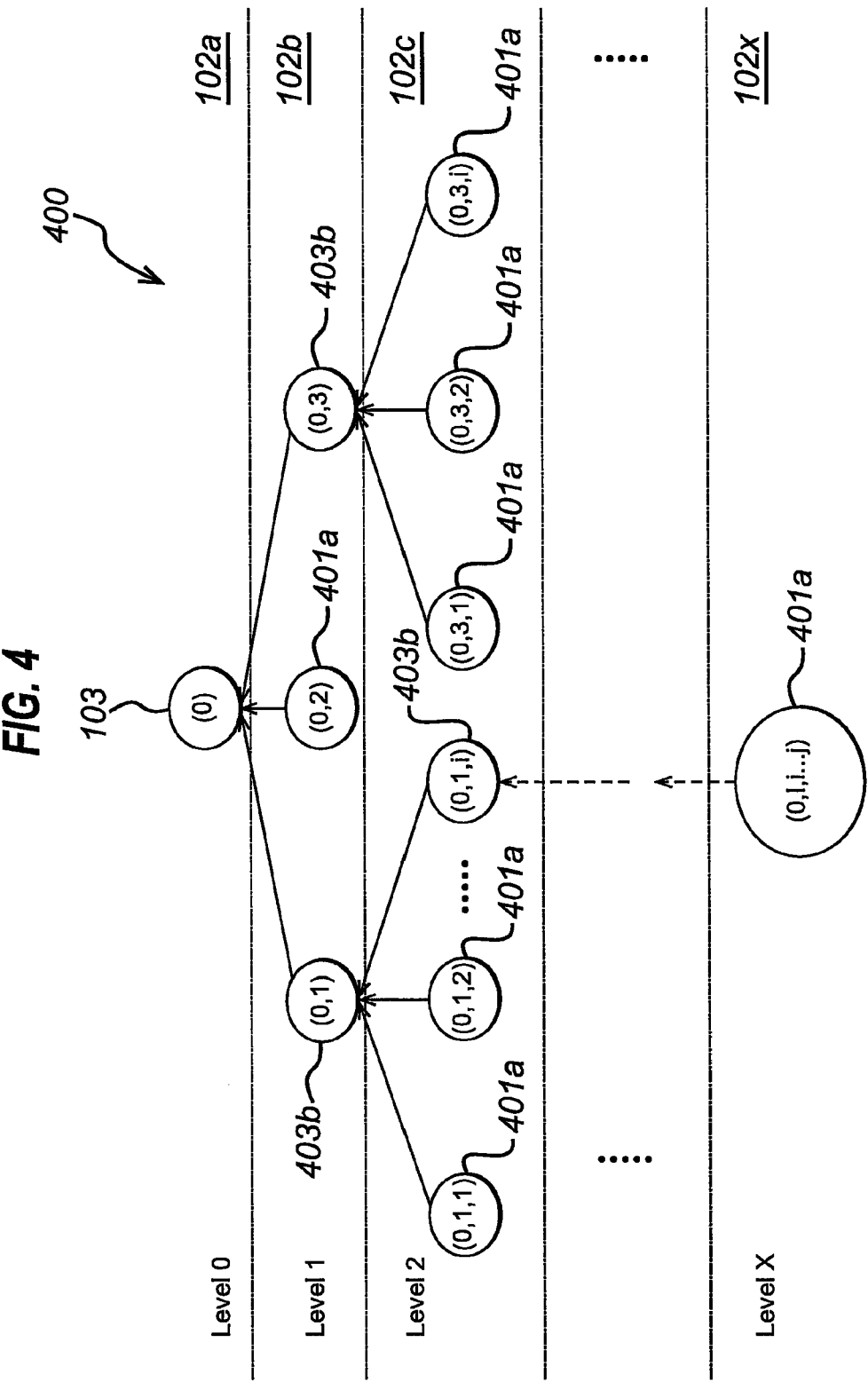
FIG. 4 is a schematic representation of layers of financial instruments to which the present invention can be applied.

FIG. 4 shows an exemplary tranche liability structure 400 in which layers 102a . . . 102x of the tranche structure are shown. The exemplary structure has a tranche security 103 which references underlying assets 401 in underlying layers 102b . . . 102x. The assets 401 can be a loan/bond asset 401a (i.e. a childless base asset 104) or an SPE asset (or other asset 106) 401b. (0) represents tranche security 103, i.e. a single tranche liability of an entity, possibly an SPE (although it could be the single tranche of a CDO). Security 103 owns three assets, namely (0,1), (0,2) and (0,3). (0,2) is a loan/bond asset 401a of a single borrower as it does not own any other assets (i.e. it does not have any children). (0,1) is an SPE asset 401b which owns or references three other assets. (0,1,1) and (0,1,2) are each a single issuer or borrower, i.e. a loan/bond asset 401a. (0,1,i) is an SPE asset 401b which owns other assets (i.e. it has children). Similarly (0,3) is an SPE asset 401b which owns three assets, namely (0,3,1), (0,3,2) and (0,3,i), none of which own or reference other assets and so are loan/bond assets 401a.

Two example applications of the present invention are now explained below.

Example A

If there is a typical subprime securitization, a "BBB+" rated tranche might have subordination of 5% and might be itself 1.5% wide, and therefore will be supporting 93.5% of the liabilities above it. Then we can calculate STL as 95/1.5 or 63.3 times levered. Let's assume a mezz CDO is filled primarily with these securities. Then if we look at the super senior tranche of a mezz ABS CDO, which would get nearly zero capital allocated to it if it was hedged with an insurance company, that "AAA" tranche would have an STL of 1 times the underlying asset STL of 63.3, times or would be 63.3 times levered.

Example B

The junior "AAA" tranche of a HG ABS CDO might have 5% subordination and be 3% thick. This alone then has an STL of 95/3 or 31.6. In addition these deals would be in large part comprised of underlying single A rated ABS assets with 7% subordination and with STL(0) of 54. The combined STL(X) might then for this junior "AAA" tranche be 31.6 times 54 or 1,706. Basel II under IRB required 12%*8% or 96 bps in capital for this 1,706 times levered asset. While the asset might have no losses as long as the underlying asset pool had less than 7% losses (the typical subordination for A rated subprime assets), once they reached 7% losses the extreme STL would wipe out the investment almost immediately. The STL which might be achieved by a bank would than again be 100%/0.96 or 104.1 times 1,706 or 177,424 times levered.

Figure 5:
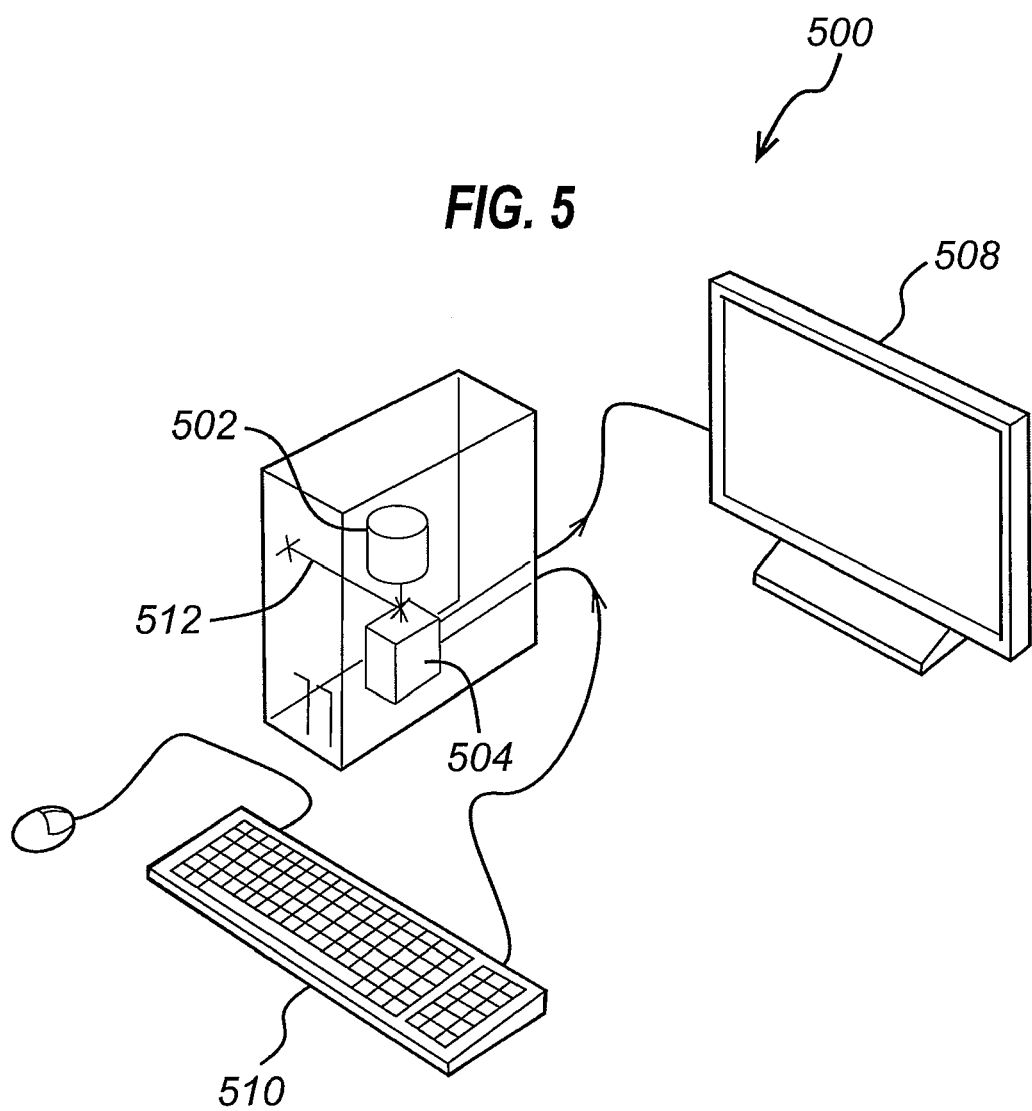
FIG. 5 is a schematic of an apparatus for performing the processes of FIGS. 1 to 3.

FIG. 5 shows an apparatus 500 for determining STL(0), ESTL(0), STL(X) and ESTL(X) in accordance with the present invention. The apparatus 500 comprises a processing device 502, for example a computer, which comprises central processing unit 505 and memory 506 which are connected to each other and also to output display 508 and input device 510, such as a keyboard and/or pointing device. The memory 506 is a storage device, such as a hard disc drive, which comprises computer executable instructions for performing the processes of the present invention and providing outputs of the processes to external devices (not shown) connected over network connection 512 and/or to output display 508. Data relating to the tranches, securities and loans processed according to the invention is stored in memory 506 and can be input by input device 510, or obtained via network connection 512. The storage device comprising the computer executable instructions may also be a removable storage device, such as a compact disc (CD), digital versatile disc (DVD), flash memory drive for insertion into and/or connection with the apparatus 500 and processing device 502.

The present invention has been described above purely by way of example and modifications of detail can be made within the scope of the invention. Uses of the phrases "the invention" or "the present invention" herein are to illustrate various aspects, embodiments, or examples as described herein, and are not intended to limit the scope of the invention, which is defined by the claims.

What is claimed is:

1. A non-transitory storage device comprising computer-executable instructions for determining risk of a first financial instrument defined by a plurality of tranches, wherein the computer-executable instructions, when executed on a programmable computer:
   store data relating to the first financial instrument, including the plurality of tranches, in a memory of the programmable computer;
   identify a width, W, of a given tranche of the plurality of tranches;
   identify an attachment point ratio, A, of the given tranche; and
   determine a liability ratio of the given tranche by subtracting the attachment point ratio from unity; and
   determine a simple tranche leverage value, STL(0), of the given tranche by dividing the liability ratio by the width.

2. The storage device of claim 1, wherein the given tranche of the first financial instrument is exposed to the risk of a preceding tranche of a second financial instrument owned by a vehicle corresponding to the given tranche, wherein the storage device further comprises computer-executable instructions for:
   calculating the STL(0) of the given tranche;
   calculating the STL(0) of the preceding tranche; and
   determining a see-through-leverage value STL(1) by multiplying the STL(0) of the given tranche by the STL(0) of the preceding tranche.

3. The storage device of claim 2, wherein a first SPE which issues tranche liabilities itself owns or is affected by the tranche liabilities of other SPEs, which own or are affected by the tranche liabilities of the other SPEs arranged in layers, the storage device further comprises computer-executable instructions for:
   determining a see-through-leverage value STL(X) of the given tranche by multiplying the STL(0) of the given tranche by the STL(0) of each preceding tranche, wherein X is an integer representative of the number of layers of preceding tranches.

4. The storage device of claim 1, wherein the given tranche of the first financial instrument contains a risk associated with a plurality of preceding tranches of a second financial instrument owned by a vehicle, the second financial instrument comprising a preceding tranche representative of an underlying debt obligation, wherein the storage device further comprises computer-executable instructions for:
   calculating the STL(0) of the given tranche;
   calculating ESTL(1) for the preceding tranche by determining STL(0) for the preceding tranche and multiplying the determined STL(0) for the preceding tranche by a borrower leverage of its underlying debt obligation; and
   determining an enhanced see-through-leverage value ESTL(X) by multiplying the STL(0) of the given tranche by the ESTL(1) of the preceding tranche.

5. The storage device of claim 1, wherein the given tranche of the first financial instrument contains or is affected by a plurality of preceding tranches owned by a vehicle of one of the financial instruments which are arranged in layers, wherein the storage device further comprises computer-executable instructions for:
   (a) determining STL(0) for each of the tranches for a given financial instrument in a given layer;
   (b) determining a weighted average of STL(0) WAVGSTL(X), for all the financial instruments in the given layer;
   (c) determining STL(0) for the common parent tranche; and
   (d) determining a see-through leverage value, STL(X) for the common parent, by multiplying STL(0) for the common parent tranche by WAVGSTL(X) of children of the common parent tranche.

6. The storage device of claim 5, further comprising computer-executable instructions which, when performing (a) and a tranche is childless, cause the determined STL(0) for the childless tranche to be multiplied by borrower leverage for an underlying loan of the childless tranche, such that when performing (d), an enhanced see-through-leverage value ESTL(X) is determined.

7. The storage device of claim 6, wherein computer-executable instructions determine the borrower leverage value by dividing unity by the loan-to-value ratio, LTV, of the underlying child obligation subtracted from unity, or is determined from a ratio of Debt/Equity, Debt/EBITDA or Debt/Capital of the debt obligation.

8. The storage device of claim 1, wherein the computer-executable instructions determine the width, W, of the given tranche by subtracting the attachment point ratio of the given tranche from a detachment point ratio of the given tranche.

9. A method for determining risk of a first financial instrument defined by a plurality of tranches, comprising:
   (a) storing data relating to the first financial instrument, including the plurality of tranches, in a memory of a programmed computer;
   (b) identifying, by the programmed computer, a width, W, of a given tranche of the plurality of tranches;
   (c) identifying, by the programmed computer, an attachment point ratio, A, of the given tranche; and
   (d) determining, by the programmed computer, a liability ratio of the given tranche by subtracting the attachment point ratio from unity; and
   (e) determining, by the programmed computer, a simple tranche leverage value, STL(0), of the given tranche by dividing the liability ratio by the width.

10. The method of claim 9, wherein the given tranche of the first financial instrument is exposed to the risk of a preceding tranche of a second financial instrument owned by a vehicle corresponding to the given tranche, wherein the method further comprises:
   calculating, by the programmed computer, the STL(0) of the given tranche according to steps (a) to (d);
   calculating, by the programmed computer, the STL(0) of the preceding tranche according to steps (a) to (d); and
   determining, by the programmed computer, a see-through-leverage value STL(1) by multiplying the STL(0) of the given tranche by the STL(0) of the preceding tranche.

11. The method of claim 10, wherein a first SPE which issues tranche liabilities itself owns or is affected by the tranche liabilities of other SPEs, which own or are affected by the tranche liabilities of the other SPEs arranged in layers, wherein the method further comprises:
   determining, by the programmed computer, a see-through-leverage value STL(X) of the given tranche by multiplying the STL(0) of the given tranche by the STL(0) of each preceding tranche,
   wherein X is an integer representative of the number of layers of preceding tranches.

12. The method of claim 9, wherein the given tranche of the first financial instrument contains a risk associated with a plurality of preceding tranches of a second financial instrument owned by a vehicle, the second financial instrument comprising a preceding tranche representative of an underlying debt obligation, the method comprising:
   calculating, by the programmed computer, the STL(0) of the given tranche according to steps (b) to (e);
   calculating, by the programmed computer, ESTL(1) for the preceding tranche by determining STL(0) for the preceding tranche according to steps (b) to (e) and multiplying the determined STL(0) for the preceding tranche by a borrower leverage of its underlying debt obligation; and
   determining, by the programmed computer, an enhanced see-through-leverage value ESTL(X) by multiplying the STL(0) of the given tranche by the ESTL(1) of the preceding tranche.

13. The method of claim 9, wherein the given tranche of the first financial instrument contains or is affected by a plurality of preceding tranches owned by a vehicle of one of the financial instruments which are arranged in layers, comprising:
   (f) determining, by the programmed computer, STL(0) for each of the tranches for a given financial instrument in a given layer according to steps (b) to (e);
   (g) determining, by the programmed computer, a weighted average of STL(0) WAVGSTL(X), for all the financial instruments in the given layer having a common parent tranche;
   (h) determining, by the programmed computer, STL(0) for the common parent tranche according to steps (b) to (e); and
   (i) determining, by the programmed computer, a see-through leverage value, STL(X) for the common parent, by multiplying STL(0) for the common parent tranche by WAVGSTL(X) of children of the common parent tranche.

14. The method of claim 13, wherein when performing step (f) and a tranche is childless, multiplying the determined STL(0) for the childless tranche by borrower leverage for an underlying loan, such that when performing step (i), an enhanced see-through-leverage value ESTL(X) is determined.

15. The method claim 12, wherein the borrower leverage value is determined by dividing unity by the loan-to-value ratio, LTV, of the underlying child obligation subtracted from unity, or is determined from a ratio of Debt/Equity, Debt/EBITDA or Debt/Capital of the debt obligation.

16. The method claim 14, wherein the borrower leverage value is determined by dividing unity by the loan-to-value ratio, LTV, of the underlying child obligation subtracted from unity, or is determined from a ratio of Debt/Equity, Debt/EBITDA or Debt/Capital of the debt obligation.

17. The method of claim 9, wherein the width, W, of the given tranche is determined by subtracting the attachment point ratio of the given tranche from a detachment point ratio of the given tranche.

* * * * *